Feb. 14, 1956 J. DOLZA 2,734,352
VEHICLE REFRIGERATING APPARATUS
Filed Jan. 18, 1952

INVENTOR.
JOHN DOLZA
BY
Willits, Wardman & Fehr

United States Patent Office 2,734,352
Patented Feb. 14, 1956

2,734,352

VEHICLE REFRIGERATING APPARATUS

John Dolza, Davisburg, Mich., assignor to General Motors Corporation, Dayton, Ohio, a corporation of Delaware Application January 18, 1952, Serial No. 267,170

6 Claims. (Cl. 62—117.1)

This invention relates to refrigerating apparatus and more particularly to apparatus for conditioning the air in an automobile.

The wide variation in the speed of an automobile engine greatly complicates the problem of driving various accessories such as refrigerant compressors, generators, and the like directly from the crankshaft of the engine. Conventional belt drives either provide inadequate compressor capacity at slow car speeds or require the compressor to be driven at excessive speeds at high car speeds.

It is an object of this invention to provide an improved drive arrangement for transmitting power from the car engine to a refrigerant compressor, or the like.

More particularly it is an object of this invention to provide a two-speed power transmission arrangement which automatically provides fast cooling of a car after starting the engine and while operating at slow speeds such as for city driving and which automatically reduces the speed of the compressor relative to the speed of the enigne when the car engine is operating at higher speeds such as on the open highway.

Still another object of this invention is to provide an improved means for further controlling the output of a refrigerant compressor independently of variations in the speed of the compressor.

Further objects and advantages of the present invention will be apparent from the following description, reference being had to the accompanying drawings wherein a preferred form of the invention is clearly shown.

Figures 1, 2, 3:
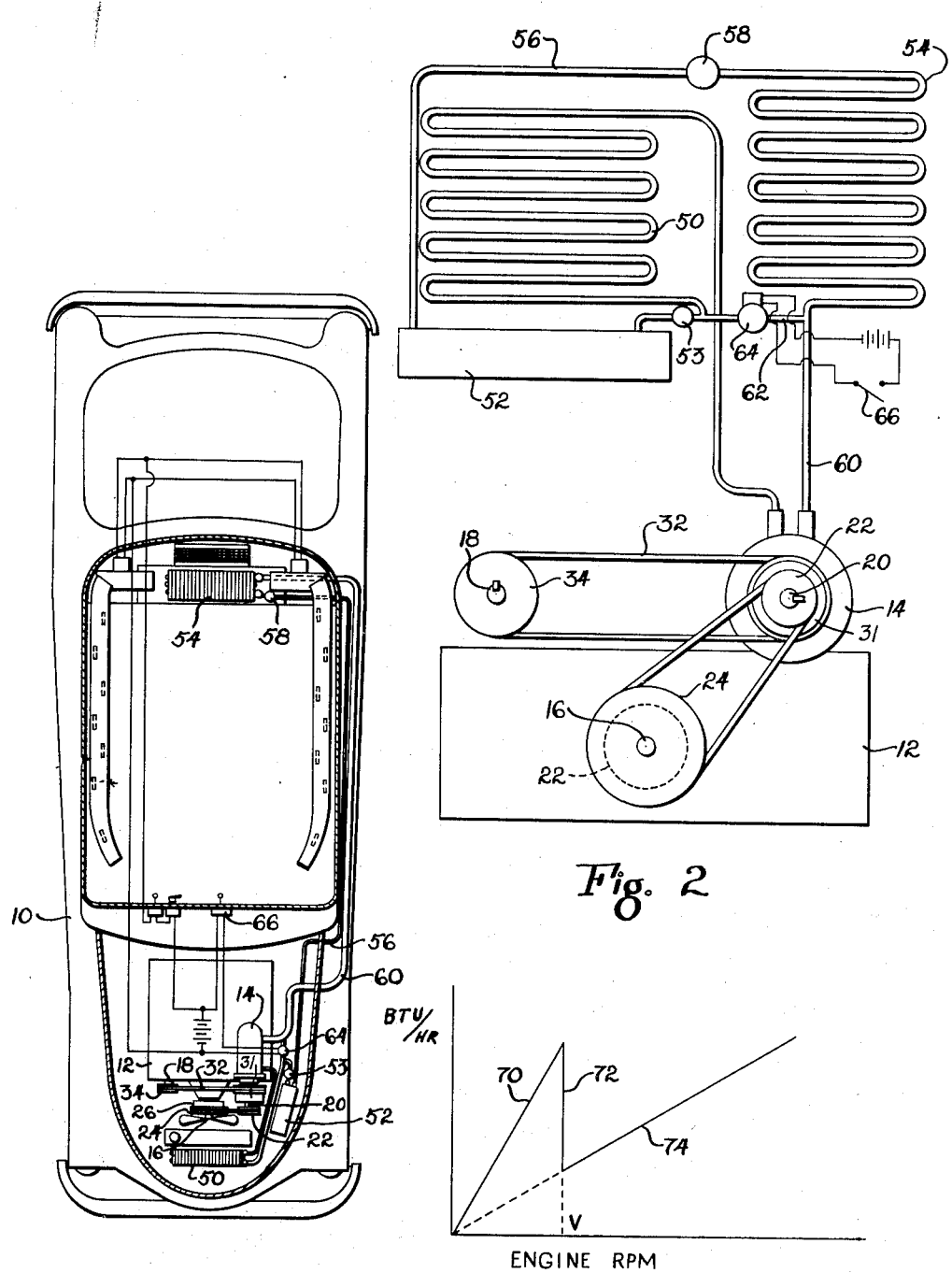
Figure 1 is a plan view largely diagrammatic of an automobile equipped with a cooling system embodying the present invention.
Figure 2 is an elevational view partly diagrammatic showing the arrangement for transmitting power from the car engine to the compressor.
Figure 3 is a chart showing the relationship between the compressor output and the engine speed.

Referring now to the drawing wherein there is shown a preferred embodiment of the invention, reference numeral 10 generally designates an automobile having a main engine 12 which not only serves to propel the car but also drives a refrigerant compressor 14 which is mounted in the engine compartment of the car. As best shown in Figure 2 of the drawing, the engine 12 is provided with the usual crankshaft 16 and the usual camshaft 18 which operates at one-half the speed of the crankshaft 16 in accordance with well-known practice.

The compressor 14 is provided with a main drive shaft 20, which has keyed thereto a drive pulley 22 as shown. The crankshaft 16 has mounted thereon a complementary pulley 24 which is adapted to be driven by the crankshaft 16 through a centrifugal clutch 26. The clutch 26 may be any conventional speed responsive clutch and is designed to disengage the pulley 24 from the drive shaft 16 at high engine speeds. The particular speed at which the clutch throws out will be determined by a number of factors such as the design of the compressor, the cooling load, the auxiliary refrigeration control and so forth.

The compressor shaft 20 is provided with a second drive pulley 30 which is connected to the shaft 20 through an overrunning clutch 31 which allows the compressor shaft to be operated at speeds in excess of the speed of the pulley 30 at such times when the centrifugal clutch 26 is engaged. A belt 32 connects the compressor drive pulley 30 to a pulley 34 which is keyed to the camshaft 18. By virtue of the above described arrangement, it is apparent that at lower engine speeds the compressor 14 will be driven directly from the main crankshaft 16, but as the engine attains that speed at which the centrifugal clutch 26 throws out, the compressor will then be driven at a reduced speed from the camshaft 18. The above described arrangement provides a very practical two-speed drive for the compressor whereby the compressor is operated at a relatively high speed when the car is used for city driving and the like.

The compressor 14 is adapted to discharge the compressed refrigerant directly into a condenser 50 wherein the compressed refrigerant is condensed before entering the receiver 52 through a check valve 53. Liquid refrigerant flows from the receiver 52 into the evaporator 54 through the liquid line 56 in which there is provided a conventional thermostatic expansion valve 58 for controlling the flow of the liquid refrigerant into the evaporator in accordance with standard practice. The low pressure refrigerant vapor leaving the evaporator returns to the compressor 14 through the suction line 60 in accordance with well-known practice.

Since the compressor is operated continuously when the car engine is operating, it is preferable that some additional control should be provided for in effect shutting off or modulating the cooling at such times when little or no cooling is required. For this purpose a by-pass connection 62 has been provided which connects the suction line 60 to the outlet of the condenser as best shown in Figure 2, and a valve 64 has been provided in this by-pass for controlling the flow of refrigerant therein. For purposes of illustration, this valve has been shown as a solenoid valve controlled by the switch 66 located on the dashboard of the car whereas this valve could be a manually operated valve or one which would automatically respond to changes in cooling requirements.

It will be noted that the above described arrangement provides an effective means for shutting off the air conditioning equipment without stopping the compressor and without depriving the compressor of the cooling effect produced by the refrigerant vapor returning to the compressor. Thus, it will be seen that the by-pass 62 is arranged so that the refrigerant vapor returning to the compressor through the by-pass is required to flow through the condenser 50 so as to be cooled thereby before being returned to the compressor.

Figure 3 of the drawing illustrates the relationship between the engine speed and the B. T. U. output per hour of the compressor. As indicated by Figure 3 of the drawing, when the engine first starts up and while the centrifugal clutch 26 is engaged, the compressor output is relatively very great as is shown by the line 70. When the engine reaches a predetermined speed indicated by the letter "V" in Figure 3, the centrifugal clutch 26 throws out and the compressor output drops as indicated by the line 72 to the line 74 which indicates the output of the compressor when the compressor is driven from the relatively slow speed camshaft 18. The actual amount of reduction in speed which takes place when the speed responsive clutch 26 becomes disengaged will be determined partly by the relative sizes of the various drive pulleys.

While the form of embodiment of the invention as herein disclosed constitutes a preferred form, it is to be understood that other forms might be adopted as may come within the scope of the claims which follow.

What is claimed is as follows:

1. In an air conditioning system for an automobile or the like, a compressor, a condenser, an evaporator, refrigerant flow connections between said compressor, condenser, and said evaporator, a prime mover having a first relatively high speed drive shaft and a second relatively low speed drive shaft, first power transmitting means between said first drive shaft and said compressor including a speed responsive clutch arrangement to disengage said first power transmitting means at relatively high engine speeds, second power transmitting means between said second drive shaft and said compressor including an overrunning clutch arranged to allow said compressor to be operated by said first named power transmitting means at relatively low engine speeds.

2. In an air conditioning system for an automobile or the like, a compressor having an inlet and an outlet, a condenser having an inlet and an outlet, an evaporator, refrigerant flow connections between said compressor, condenser, and said evaporator, a prime mover having a first relatively high speed drive shaft and a second relatively low speed drive shaft, first power transmitting means between said first drive shaft and said compressor including speed responsive means to disengage said first power transmitting device at relatively high engine speeds, second power transmitting means between said second drive shaft and said compressor including an overrunning clutch arranged to allow said compressor to be operated by said first named power transmitting means at relatively low engine speeds, and by-pass means connecting the inlet of said compressor to the outlet of said condenser for controlling the effective output of said compressor.

3. In an air conditioning system for an automobile or the like, a compressor having an inlet and an outlet, a condenser having an inlet and an outlet, an evaporator, refrigerant flow connections between said compressor, condenser, and said evaporator, a prime mover having a first relatively high speed drive shaft and a second relatively low speed drive shaft, first power transmitting means between said first drive shaft and said compressor including speed responsive means to disengage said first power transmitting device at relatively high engine speeds, second power transmitting means between said second drive shaft and said compressor including an overrunning clutch arranged to allow said compressor to be operated by said first named power transmitting means at relatively low engine speeds, and means for controlling the effective cooling capacity of the air conditioning system independently of the variations in compressor speed.

4. In an air conditioning system for use in an automobile or the like wherein an engine is provided with a first shaft operating at a relatively high speed and a second shaft operating a relatively low speed, the combination, a compressor, a condenser, and evaporator, refrigerant flow connections between said compressor, condenser and evaporator, first power transmitting means between said compressor and said first shaft comprising a speed responsive means arranged to disengage upon said first shaft attaining a predetermined speed, and second power transmitting means connecting said second shaft and said compressor, said second power transmitting means including an overrunning clutch whereby at low engine speeds said first named power transmitting means will serve to transmit power from said engine to said compressor and at higher car speeds said second power transmitting means will serve to transmit power from said engine to said compressor.

5. In combination, an engine having a first relatively high speed drive shaft and a second relatively low speed drive shaft operated simultaneously with said high speed drive shaft at all times, a driven device, first power transmitting means between said first drive shaft and said driven device including a speed responsive clutch constructed and arranged to declutch said first power transmitting means at relatively high engine speeds, and second power transmitting means between said second drive shaft and said driven device including an overrunning clutch arranged to allow said driven device to be operated by said first power transmitting means at relatively low engine speeds.

6. In combination, a variable speed power unit having two shafts which operate simultaneously but at different speeds, a driven device, first means for transmitting power from one of said shafts to said driven device including an overrunning clutch, and second means for transmitting power from the other of said shafts to said driven device including a speed responsive clutch operative to declutch said second power transmitting means in response to a predetermined change in the speed of said power unit.

References Cited in the file of this patent

UNITED STATES PATENTS

| | | |
|---|---|---|
| 1,882,597 | Hilger | Oct. 11, 1932 |
| 1,979,077 | Pilaar | Oct. 30, 1934 |
| 2,195,139 | Waseige | Mar. 26, 1940 |
| 2,207,728 | Goodman | July 16, 1940 |
| 2,216,690 | Madden | Oct. 1, 1940 |
| 2,230,293 | Harris | Feb. 4, 1941 |
| 2,264,821 | Zukowski | Dec. 2, 1941 |
| 2,316,131 | Cardwell | Apr. 6, 1943 |